United States Patent Office 3,170,941
Patented Feb. 23, 1965

3,170,941
NITROGEN-CONTAINING SPIRANES AND
SILOXANES AND THEIR PREPARATION
John L. Speier, Midland, Mich., assignor to Dow
Corning Corporation, Midland, Mich., a corporation of Michigan
No Drawing. Filed Oct. 12, 1961, Ser. No. 144,538
20 Claims. (Cl. 260—448.2)

This invention relates to new and useful nitrogen-containing spiranes and methods for their preparation. This invention also relates to new nitrogen-containing siloxanes and methods for their preparation.

It is an object of the present invention to prepare novel nitrogen-containing spiranes. Another object is to prepare nitrogen-containing polysiloxanes from these spiranes. A further object is to prepare copolymers of conventional siloxanes and these nitrogen-containing siloxanes. Other objects and advantages will be apparent from the following description.

The novel nitrogen-containing spiranes of this invention have the general formula

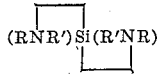

wherein R is selected from the group consisting of monovalent hydrocarbon, monovalent hydrocarbon radicals containing oxygen in the form of

linkages, aminoalkyl, aminophenyl and halogenophenyl radicals and R' is a divalent saturated aliphatic hydrocarbon radical, wherein the nitrogen atom is attached to a carbon atom which is at least the third and not more than the sixth carbon atom away from the silicon atom.

R in the above formula can be a monovalent hydrocarbon radical. Specific examples of such radicals are alkyl radicals, such as methyl, ethyl, t-butyl and octyl; alkenyl radicals, such as vinyl, allyl and butadienyl; cycloalkyl radicals, such as cyclobutyl, cyclopentyl and cycohexyl; cycloalkenyl radicals, such as cyclopentenyl and cyclohexenyl; aryl radicals such as phenyl and xenyl; aralkyl radicals such as benzyl and xylyl and alkaryl radicals, such as tolyl. R can be a monovalent hydrocarbon radical containing oxygen in the form of

linkages. Specific examples of such radicals are $CH_3CH_2OCH_2$—, $CH_3CH_2OCH_2CH_2$— and $CH_3OC_6H_4$—. R can also be an aminoalkyl group, such as aminomethyl, aminoethyl, aminohexyl and aminooctyl. R can also be an aminophenyl radical. R can be a halogenophenyl group, such as p-$ClC_6H_4$— and m-$BrC_6H_4$—. R' is a divalent saturated aliphatic hydrocarbon radical, wherein the nitrogen atom is attached to a carbon atom which is at least the third and not more than the sixth carbon atom away from the silicon atom. Suitable examples of R' are —$CH_2CH_2CH_2$—,

—$CH_2(CH_2)_2CH_2$—, —$CH_2(CH_2)_3CH_2$— and —$CH_2(CH_2)_4CH_2$—. The R' group can also be a branched alkylene group such as

—$CH_2CH(CH_3)CH_2$—, —$CH_2CH(CH_2CH_3)CH_2CH_2$— and —$CH_2CH[(CH_2)_2CH_3]CH_2CH_2CH_2$—. Thus, there can be more than six carbon atoms in the R' group as long as there are no more than six carbon atoms in the chain between the silicon atom and the nitrogen atom.

These spirane compounds can be prepared by effecting a reaction between (1) a di-(halogenoalkyl)-dihalogenosilane of the formula $(XR')_2SiX_2$ and (2) an amino compound of the formula $RNH_2$. R and R' are as defined above and X is a chlorine, bromine or iodine atom.

The reaction between (1) and (2) takes place within a wide range of atmospheric and superatmospheric pressures. Superatmospheric pressures are preferred for faster and more complete reaction. The reaction can be carried out at various temperatures. Generally, temperatures ranging from about 75° to 150° C. are advantageously employed. However, the reaction appears to go satisfactorily in many instances at room temperature.

After the reaction has been concluded, the hydrogen halide produced is removed and the resultant product is separated by distillation or other suitable means. The amount of amino compound employed for this reaction should be sufficient to react with all the halogen atoms in (1). It is usually desirable that the reaction be conducted using an excess of the amino compound since this permits easier separation of the pure product, because the amino compound acts as a hydrogen halide acceptor. If desired, inert hydrogen halide acceptors such as tributylamine, pyridine and quinoline may be substituted in place of some of the excess amino compound intended as a hydrogen halide acceptor. It is preferable to use between 7 and 10 mols of (2) per mol of (1).

The spiranes of this invention can be hydrolyzed and condensed to produce nitrogen-containing polysiloxanes. The siloxanes produced from these spiranes have the unit formula $(RNHR')_2SiO$, wherein R and R' are as defined above.

The spiranes of this invention can be hydrolyzed with silanes containing hydrolyzable groups

[e.g., $(CH_3)_2Si(OCH_3)_2$]

to produce copolymers containing $(RNHR')_2SiO$ units and

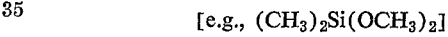

units. R''' can be a monovalent hydrocarbon radical or a halogenated monovalent hydrocarbon radical, such as —$CH_2CH_2CF_3$— or —$CH_2Cl$—. The subscript $n$ has a value of from 1 to 3 inclusive. The spiranes of this invention can also be cohydrolyzed with nitrogen-containing cyclic silanes of the formula

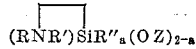

to produce copolymers containing $(RNHR')_2SiO$ units and

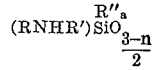

units. R and R' are as defined above. Z is an alkyl or phenyl radical or an alkyl radical containing oxygen in the form of

linkages, such as —$CH_2OCH_3$. R'' is a monovalent hydrocarbon radical and $a$ has a value of from 0 to 2 inclusive. The nitrogen-containing cyclic silanes which are used to produce these copolymers are fully described in applicant's copending application entitled Nitrogen-Containing Cyclic Silanes, Their Preparation and Hydrolysis, filed simultaneously herewith, the disclosure of which is hereby incorporated in this application by reference.

The hydroxy endblocked nitrogen-containing siloxanes of this invention can be reacted with the cyclic silanes disclosed in applicant's copending application (identified above) to produce a nitrogen-containing siloxane which is endblocked with units containing nitrogen attached to silicon through a divalent saturated aliphatic hydrocarbon radical. These endblocked siloxanes are produced by effecting a reaction between (1)
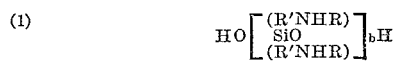

and (2)

A product of the formula

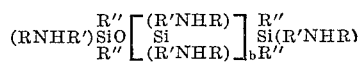

is obtained. R, R' and R'' are as defined above. The subscript $b$ has a value of at least 1.

The polymers and copolymers of this invention can be employed as a basis for rubbers and oils. These polysiloxanes are also useful as corrosion inhibitors in solutions that are in contact with steel. The siloxanes of the unit formula $(RNHR')_2SiO$ can be used as curing agents in polyurethane resins.

The following examples are illustrative only and should not be construed as limiting the invention which is properly delineated in the appended claims.

EXAMPLE 1

Di(3-chloro-2-methylpropyl)dichlorosilane (169 g., 0.6 mol) and methylamine (409 g., 13.2 mols) were heated at 100° C. for 8 hours. The mass was then cooled and the layers separated. Distillation of the top layer at 30 mm. pressure gave a 41 percent yield of

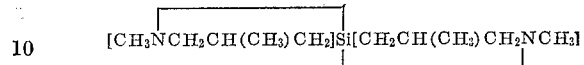

Into a flask containing 9.92 g. (0.05 mol) of the above product there was added 0.9 g. of distilled water. A temperature rise from 27° C. to 140° C. occurred after stirring the reactants. A quantitative yield of siloxane of the unit formula

was obtained.

EXAMPLE 2

The following spiranes are obtained when the following di-(halogenoalkyl) - dihalogenosilanes and amino compounds are reacted in accordance with the procedure of Example 1. The following siloxanes are obtained when these spiranes are hyrolyzed in accordance with the procedure of Example 1.

*Table I*

| Reactants | | Spirane | Unit formula of siloxane product |
| --- | --- | --- | --- |
| Silane | Amine | | |
| [ClCH$_2$(CH$_2$)$_2$CH$_2$]$_2$SiCl$_2$ | C$_5$H$_{11}$NH$_2$ | [C$_5$H$_{11}$NCH$_2$(CH$_2$)$_2$CH$_2$]Si[CH$_2$(CH$_2$)$_2$CH$_2$NC$_5$H$_{11}$] | [C$_5$H$_{11}$NHCH$_2$(CH$_2$)$_2$CH$_2$]$_2$SiO |
| [BrCH$_2$(CH$_2$)$_4$CH$_2$]$_2$SiBr$_2$ | CH$_2$=CHCH$_2$NH$_2$ | [CH$_2$=CHCH$_2$NCH$_2$(CH$_2$)$_4$CH$_2$]Si[CH$_2$(CH$_2$)$_4$CH$_2$NCH$_2$CH=CH$_2$] | [CH$_2$=CHCH$_2$NHCH$_2$(CH$_2$)$_4$CH$_2$]$_2$SiO |
| [ICH$_2$(CH$_2$)$_3$CH$_2$]$_2$SiI$_2$ | C$_6$H$_5$NH$_2$ | [C$_6$H$_5$NCH$_2$(CH$_2$)$_3$CH$_2$]Si[CH$_2$(CH$_2$)$_3$CH$_2$NC$_6$H$_5$] | [C$_6$H$_5$NHCH$_2$(CH$_2$)$_3$CH$_2$]$_2$SiO |
| [ClCH$_2$CH(CH$_2$CH$_3$)CH$_2$]$_2$SiCl$_2$ | NH$_2$CH$_2$CH$_2$NH$_2$ | [NH$_2$CH$_2$CH$_2$NCH$_2$CH(CH$_2$CH$_3$)CH$_2$]Si[CH$_2$CH(CH$_2$CH$_3$)CH$_2$NCH$_2$CH$_2$NH$_2$] | [NH$_2$CH$_2$CH$_2$NHCH$_2$CH(CH$_2$CH$_3$)CH$_2$]$_2$SiO |
| (ClCH$_2$CH$_2$CH$_2$)$_2$SiCl$_2$ | NH$_2$C$_6$H$_4$NH$_2$ | (NH$_2$C$_6$H$_4$NCH$_2$CH$_2$CH$_2$)Si(CH$_2$CH$_2$CH$_2$NC$_6$H$_4$NH$_2$) | (NH$_2$C$_6$H$_4$NHCH$_2$CH$_2$CH$_2$)$_2$SiO |
| (ClCH$_2$CH$_2$CH$_2$)$_2$SiCl$_2$ | p-ClC$_6$H$_4$NH$_2$ | (ClC$_6$H$_4$NCH$_2$CH$_2$CH$_2$)Si(CH$_2$CH$_2$CH$_2$NC$_6$H$_4$Cl) | (ClC$_6$H$_4$NHCH$_2$CH$_2$CH$_2$)$_2$SiO |
| (ClCH$_2$CH$_2$CH$_2$)$_2$SiCl$_2$ | CH$_3$OCH$_2$CH$_2$NH$_2$ | (CH$_3$OCH$_2$CH$_2$NCH$_2$CH$_2$CH$_2$)Si(CH$_2$CH$_2$CH$_2$NCH$_2$CH$_2$OCH$_3$) | (CH$_3$OCH$_2$CH$_2$NHCH$_2$CH$_2$CH$_2$)$_2$SiO |

EXAMPLE 3

Copolymers containing siloxane units of the following formulae are obtained when the following silanes and spiranes are hydrolyzed in accordance with the procedure shown in Example 1.

Table II

| Reactants | | Siloxane Units Contained in Copolymer |
|---|---|---|
| Silane | Spirane | |
| 50 mol percent of $(CH_3)_2Si(OCH_3)_2$ | 50 mol percent of $[CH_3NCH_2CH(CH_3)CH_2]Si[CH_2CH(CH_3)CH_2NCH_3]$ | $(CH_3)_2SiO$ and $[CH_3NHCH_2CH(CH_3)CH_2]_2SiO$ |
| 25 mol percent of $(C_6H_5)Si(OCH_3)_3$ | 75 mol percent of $[NH_2CH_2CH_2N(CH_2)_6]Si[(CH_2)_6NCH_2CH_2NH_2]$ | $(C_6H_5)SiO_{1.5}$ and $[NH_2CH_2CH_2NH(CH_2)_6]_2SiO$ |
| 51 mol percent of $(CH_3)(CH_2=CH)Si(OCH_3)_2$ | 50 mol percent of $[C_6H_5N(CH_2)_4]Si[(CH_2)_4NC_6H_5]$ | $(CH_3)(CH_2=CH)SiO$ and $[C_6H_5NH(CH_2)_4]_2SiO$ |
| 5 mol percent of $(C_3H_7)_3Si(OCH_3)$ | 95 mol percent of $[NH_2C_6H_4N(CH_2)_3]Si[(CH_2)_3NC_6H_4NH_2]$ | $(C_3H_7)_3SiO_{.5}$ and $[NH_2C_6H_4NH(CH_2)_3]_2SiO$ |
| 50 mol percent of $(CF_3CH_2CH_2)(CH_3)Si(OCH_3)_2$ | 50 mol percent of $[CH_3CH_2NCH_2CH(CH_3)CH_2]Si[CH_2CH(CH_3)CH_2NCH_2CH_3]$ | $(CF_3CH_2CH_2)(CH_3)SiO$ and $[CH_3CH_2NHCH_2CH(CH_3)CH_2]_2SiO$ |
| 5 mol percent of $[CH_3NCH_2CH(CH_3)CH_2]Si(CH_3)_2$ | 95 mol percent of $[CH_3NCH_2CH(CH_3)CH_2]Si[CH_2CH(CH_3)CH_2NCH_3]$ | $[CH_3NHCH_2CH(CH_3)CH_2](CH_3)_2SiO_{.5}$ and $[CH_3NHCH_2CH(CH_3)CH_2]_2SiO$ |
| 25 mol percent of $[CH_3NCH_2CH_2CH_2]Si(CH_3)(OCH_3)$ | 75 mol percent of $[CH_3NCH_2CH_2CH_2]Si[CH_2CH_2CH_2NCH_3]$ | $(CH_3)(CH_3NHCH_2CH_2CH_2)SiO$ and $[CH_3NHCH_2CH_2CH_2]_2SiO$ |

EXAMPLE 4

The following siloxanes are obtained when the following cyclic silanes are reacted with the following hydroxy endblocked nitrogen-containing siloxanes. This reaction is effected merely by adding the cyclic silanes to the siloxane at a ratio of 2 mols of the cyclic silane per 1 mol of siloxane.

Table III

| Reactants | | Unit formula of siloxane product |
|---|---|---|
| Siloxane | Cyclic silane | |
| $HO\{SiO[CH_2CH(CH_3)CH_2NHCH_3]_2\}_{50}H$ | $[NH_2CH_2CH_2N(CH_2)_3]Si(C_6H_5)(CH_3)$ | $[NH_2CH_2CH_2NH(CH_2)_3]\{C_6H_5\cdot SiO\cdot CH_3\}[CH_2CH(CH_3)CH_2NHCH_3]\{SiO\}[CH_2CH(CH_3)CH_2NHCH_3]_{50}$ $\underset{CH_3}{\overset{C_6H_5}{Si}}[(CH_2)_3NHCH_2CH_2NH_2]$ |
| $HO\{SiO[CH_2CH(CH_2CH_3)CH_2NHCH_2CH_2NH_2]_2\}_{100}H$ | $[CH_3NCH_2CH(CH_3)CH_2]Si(CH_3)_2$ | $[CH_3NHCH_2CH(CH_3)CH_2]\{CH_3[CH_2CH(CH_2CH_3)CH_2NHCH_2CH_2NH_2]\cdot SiO\cdot CH_3\}[CH_2CH(CH_2CH_3)CH_2NHCH_2CH_2NH_2]_{100}$ $\underset{CH_3}{\overset{CH_3}{Si}}[CH_2(CH_3)CHCH_2NHCH_3]$ |

That which is claimed is:

1. A spirane of the general formula $$(RNR')Si(R'NR)$$

wherein R is selected from the group consisting of mono-valent hydrocarbon, monovalent hydrocarbon radicals containing oxygen in the form of

linkages, aminoalkyl, aminophenyl and halogenophenyl radicals and R' is a divalent saturated aliphatic hydrocarbon radical wherein the nitrogen atom is attached to a carbon atom which is at least the third and not more than the sixth carbon atom away from the silicon atom.

2. The spirane of claim 1, wherein R is a monovalent hydrocarbon radical and R' is a divalent saturated aliphatic hydrocarbon radical wherein the nitrogen atom is attached to a carbon atom which is the third carbon atom away from the silicon atom.

3. A spirane of the formula $$CH_3NCH_2CH(CH_3)CH_2SiCH_2CH(CH_3)CH_2NCH_3.$$

4. A spirane of the general formula

5.

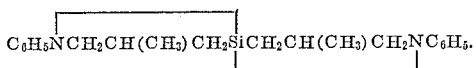

6.

7. A method for making a spirane of the formula

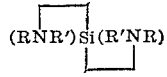

which comprises effecting a reaction between (1)                  (XR')₂SiX₂ and (2)                  RNH₂ wherein R is selected from the group consisting of monovalent hydrocarbon, monovalent hydrocarbon radicals containing oxygen in the form of

linkages, aminoalkyl, aminophenyl and halogenophenyl radicals, R' is a divalent saturated aliphatic hydrocarbon radical wherein the silicon atom is attached to a carbon atom which is at least the third and not more than the sixth carbon atom away from the other substituent attached to R' and X is a halogen atom selected from the group consisting of chlorine, bromine and iodine.

8. The method of claim 7, wherein R is a monovalent hydrocarbon radical, R' is a divalent saturated aliphatic hydrocarbon radical wherein the silicon atom is attached to a carbon atom which is the third carbon atom away from the other substituent attached to R' and X is chlorine.

9. The method for making the spirane of claim 3 which comprises effecting a reaction between (1)        [ClCH₂CH(CH₃)CH₂]₂SiCl₂ and (2)                  CH₃NH₂

10. A method for making a polysiloxane of the unit formula (RNHR')₂SiO which comprises hydrolyzing and condensing a spirane of the general formula

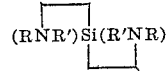

wherein R is selected from the group consisting of monovalent hydrocarbon, monovalent hydrocarbon radicals containing oxygen in the form of

linkages, aminoalkyl, aminophenyl and halogenophenyl radicals and R' is a divalent saturated aliphatic hydrocarbon radical wherein the nitrogen atom is attached to a carbon atom which is at least the third and not more than the sixth carbon atom away from the silicon atom.

11. The method of claim 10, wherein R is a monovalent hydrocarbon radical and R' is a divalent saturated aliphatic hydrocarbon radical wherein the nitrogen atom is attached to a carbon atom which is the third carbon atom away from the silicon atom.

12. The method of claim 10, wherein R is an alkyl radical of from 1 to 6 inclusive carbon atoms and R' is —CH₂CH(CH₃)CH₂—.

13. A polysiloxane of the unit formula (RNHR')₂SiO, wherein R is selected from the group consisting of monovalent hydrocarbon, monovalent hydrocarbon radicals containing oxygen in the form of

linkages, aminoalkyl, aminophenyl and halogenophenyl radicals and R' is a divalent saturated aliphatic hydrocarbon radical wherein the nitrogen atom is attached to a carbon atom which is at least the third and not more than the sixth carbon atom away from the silicon atom.

14. The polysiloxane of claim 13, wherein R is a monovalent hydrocarbon radical and R' is a divalent saturated aliphatic hydrocarbon radical wherein the nitrogen is attached to a carbon atom which is the third carbon atom away from the silicon atom.

15. The polysiloxane of claim 13, wherein R is an alkyl radical of from 1 to 6 inclusive carbon atoms and R' is —CH₂CH(CH₃)CH₂—.

16. A copolymeric siloxane composed of (1) units of the formula (RNHR')₂SiO, wherein R is selected from the group consisting of monovalent hydrocarbon, monovalent hydrocarbon radicals containing oxygen in the form of

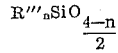

linkages, aminoalkyl, aminophenyl and halogenophenyl radicals and R' is a divalent saturated aliphatic hydrocarbon radical wherein the nitrogen atom is attached to a carbon atom which is at least the third and not more than the sixth carbon atom away from the silicon atom and (2) units selected from the group consisting of (a) units of the formula

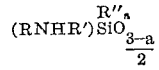

wherein R''' is selected from the group consisting of monovalent hydrocarbon and halogenated monovalent hydrocarbon radicals and n has an average value of from 1 to 3 inclusive and (b) units of the formula

wherein R, R' are as defined above, R'' is selected from the group consisting of monovalent hydrocarbon radicals and monovalent hydrocarbon radicals containing oxygen in the form of

—ĊOĊ— linkages and a has a value of from 0 to 2 inclusive.

17. A copolymeric siloxane composed of (1) units of the formula (RNHR')₂SiO, wherein R is a monovalent hydrocarbon radical and R' is a divalent saturated aliphatic hydrocarbon radical wherein the nitrogen atom is attached to a carbon atom which is the third carbon atom away from the silicon atom and (2) units of the formula

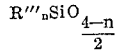

wherein R''' is a monovalent hydrocarbon radical and n has an average value of from 1 to 3 inclusive.

18. The copolymeric siloxane of claim 17, wherein R and R''' are alkyl radicals of from 1 to 6 inclusive carbon atoms and R' is —CH₂CH(CH₃)CH₂—.

19. A siloxane of the general formula

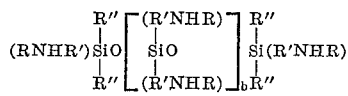

wherein R is selected from the group consisting of monovalent hydrocarbon, monovalent hydrocarbon radicals containing oxygen in the form of

linkages, aminoalkyl, aminophenyl and halogenophenyl radicals, R' is a divalent saturated aliphatic hydrocarbon radical wherein the nitrogen atom is attached to a carbon atom which is at least the third and not more than the sixth carbon atom away from the silicon atom, R'' is a monovalent hydrocarbon radical and $b$ has a value of at least 1.

20. A siloxane of claim 19, wherein R is a monovalent hydrocarbon radical, R' is a divalent saturated aliphatic hydrocarbon radical wherein the nitrogen atom is attached to a carbon atom which is the third carbon atom away from the silicon atom and R'' is an alkyl radical of from 1 to 6 inclusive carbon atoms.

References Cited by the Examiner

UNITED STATES PATENTS

| | | | |
|---|---|---|---|
| 2,738,357 | 3/56 | Speier | 260—46.5 |
| 2,921,950 | 1/60 | Jex et al. | 260—46.5 |
| 2,947,771 | 8/60 | Bailey | 260—448.2 |

FOREIGN PATENTS 642,823  6/62  Canada.

WILLIAM H. SHORT, *Primary Examiner.*

M. STEARMAN, *Examiner.*

UNITED STATES PATENT OFFICE
CERTIFICATE OF CORRECTION

Patent No. 3,170,941                                  February 23, 1965

John L. Speier

It is hereby certified that error appears in the above numbered patent requiring correction and that the said Letters Patent should read as corrected below.

Column 2, lines 54 to 56, the formula should appear as shown below instead of as in the patent:

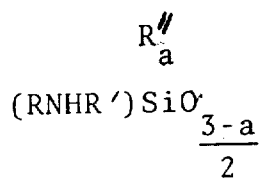

columns 3 and 4, Table I, fourth column, line 3 thereof, for "[$C_6H_5NHCH_2(CH_2)_3CH_2$]SiO" read -- [$C_6H_5NHCH_2(CH_2)_3CH_2$]$_2$SiO --; columns 5 and 6, Table II, third column, line 2 thereof, for "($C_6H_5$)SiO$_{115}$ and [$NH_2CH_2CH_2NH(CH_2)_5$]$_2$SiO" read -- ($C_6H_5$)SiO$_{1.5}$ and [$NH_2CH_2CH_2NH(CH_2)_6$]$_2$SiO --.

Signed and sealed this 28th day of September 1965.

(SEAL)
Attest:

ERNEST W. SWIDER                                EDWARD J. BRENNER
Attesting Officer                                 Commissioner of Patents